United States Patent Office 2,705,254
Patented Mar. 29, 1955

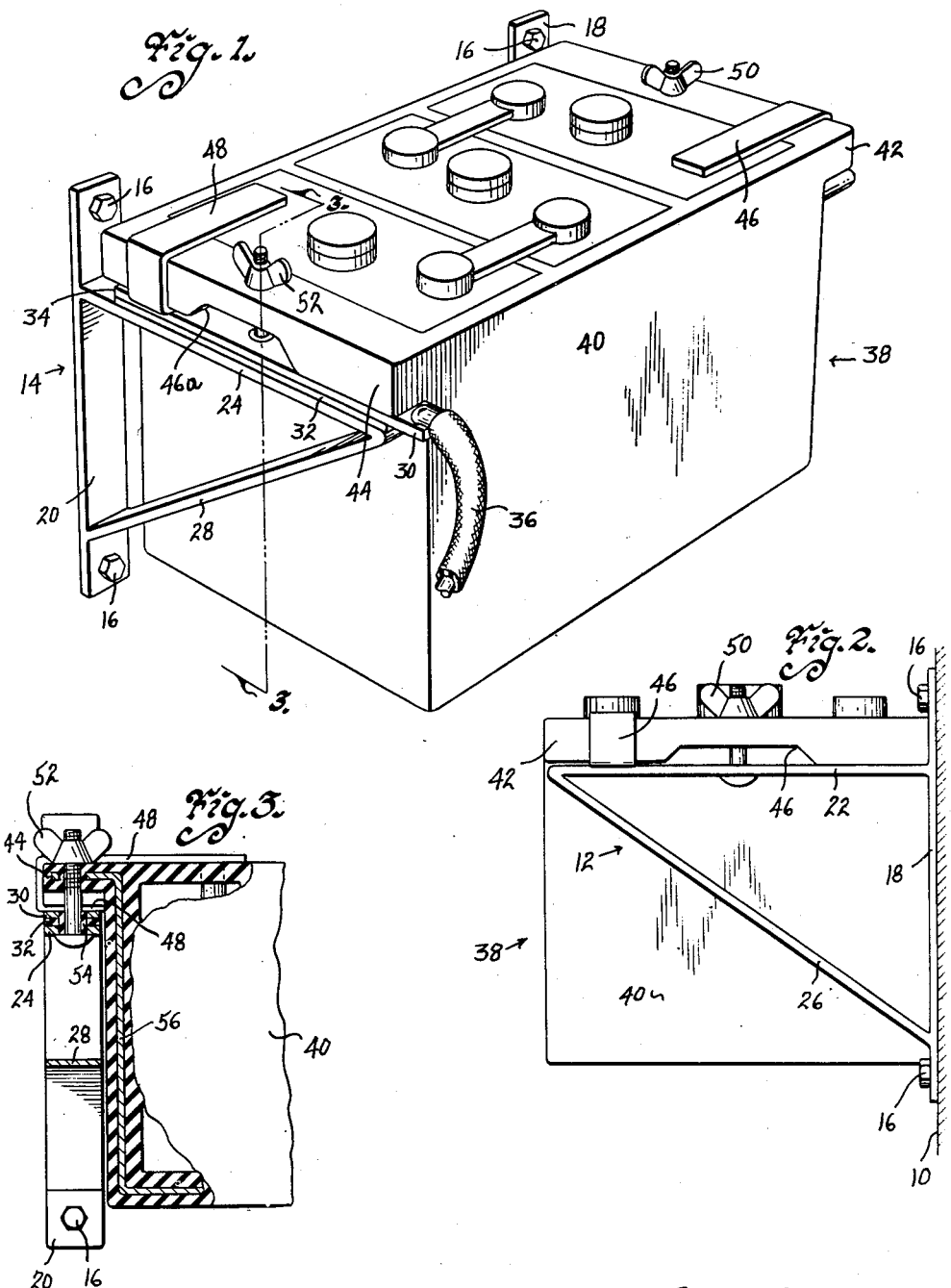

2,705,254

BATTERY AND ELECTRICAL CONDUCTOR BRACKET THEREFOR

Robert G. Middleton, Des Moines, Iowa

Application January 2, 1952, Serial No. 264,575

8 Claims. (Cl. 136—171)

My invention relates to improvement in storage batteries and is more particularly adapted to such batteries as used in motor vehicles.

The ordinary type vehicle battery in use today is mounted in a suitable box-like supporting case that is usually located within the motor compartment, but may be elsewhere, and this case is generally provided with a pair of rod or bolt securing means for holding the battery therein. For connecting the battery to the electrical system of the vehicle, it is equipped with a positive and negative post protruding from the top at opposite sides thereon. The negative post will receive a cable connection leading to a ground means and the positive post will receive a like cable connection leading to the vehicle generator. It is well known that the cable connections to these terminal posts are subject to corrosion due to their proximity to the cell openings from which acid invariably escapes and such corrosion at these contact points obviously reduces the efficiency of the electrical power. In addition, such corrosion makes it extremely difficult at times to remove the cable connections on the posts and not infrequently the cable collars must be broken to get them loose. Even when they are not broken when being removed the corrosion may have so affected them that replacements are required for efficient operation of the electrical system.

With these problems in mind it is the general aim of my invention to provide the combination of a wet cell battery and supporting bracket therefor wherein the bracket has electricity conducting capabilities connected to the vehicle generator and the battery has fixed contact points so that a complete connection of the battery to the electrical system of the vehicle is obtained merely by mounting the battery within the bracket and securing the same therein against independent movement.

More specifically, it is an object of this invention to mount a metal bracket on the vehicle frame and provide the battery with a positive and negative plate, instead of the usual posts, so that when the battery is inserted within the bracket, the negative plate will be grounded through the bracket to the vehicle frame and the positive plate will contact a conductor on but insulated from the bracket that connects to a cable means in communication with the vehicle generator.

A further object of my invention is to provide a battery for motor vehicles that is ready for use by merely placing it in a supporting bracket and does not require that independent cable connections be manually accomplished in addition to the placing of the battery within its bracket support.

A still further object of this invention is to provide a battery of the above class in which contact with the positive and negative terminals thereon are made at points protected from the opening to the cells whereby corrosive action at such contact points from acid escaping from the cells is eliminated.

Still other objects of this invention are to provide a battery as above characterized that is simple to install and remove in a motor vehicle and is efficient for its intended use.

These and other objects will be apparent to those skilled in the art.

My invention consists in the construction and arrangement of the various parts of the device, whereby the objects contemplated are attained as hereinafter more fully set forth, pointed out in my claims, and illustrated in the accompanying drawings, in which:

Fig. 1 is a perspective view of my battery mounted in the bracket therefor,

Fig. 2 is a side elevational view of this battery showing the negative battery terminal in contact with the supporting bracket, and Fig. 3 is a cross-section view taken on the line 3—3 of Fig. 1 and showing the positive battery terminal in relation to the bracket support.

Referring to the drawings I have used the numeral 10 to designate a portion of the vehicle frame to which I attach a battery supporting means such as a pair of spaced apart bracket members indicated generally at 12 and 14 by any suitable means such as the bolts 16. These brackets 12 and 14 may be of any suitable design and preferably I show them as consisting of the respective vertical bars 18 and 20, to which there is integrally secured the respective horizontal arms 22 and 24 and diagonal braces 26 and 28 as shown in Figs. 1 and 2. It is intended that the brackets 12 and 14 be of metal and the bar portions 18 and 20 are tightly secured against the metal frame for purposes of an electrical contact point as will be later described. On the arm 24 of the bracket 14 and extending outwardly therefrom is a metal contact bar 30 that has no metal to metal contact with the arm 24 by reason of a suitable strip of insulating material 32 arranged intermediate the same. It will also be observed that the inner end 34 of the bar 30 is spaced from the bracket bar 20 so as not to be in physical contact therewith. To the outer end of the bar 30 I have secured an electrical conduit or cable 36 that is designed to connect at its other end (not shown) with the generator on a motor vehicle.

The wet cell battery 38 relative to its construction for delivering electrical energy may be of any well known type and my invention resides in adapting it to accomplish the objectives which I have hereinbefore set out. For this purpose I provide on two opposite ends respectively of the battery case 40, the outwardly extending lips or shoulders 42 and 44 at the upper portion thereof as shown in Fig. 1. Each of these shoulders are notched underneath and intermediate their ends as at 46a to provide a finger grip means for manually carrying or lifting the battery. In place of the usual positive and negative terminal posts on batteries now in use, I provide the metal strap members 46 and 48 respectively. As shown in Fig. 1, the strap 46 serves as the negative terminal and extends over and under the shoulder 42, with the strap 48 serving as the positive terminal and extending over and under the shoulder 44. This battery as described is mounted in the brackets 12 and 14 so that the shoulder 42 rests on the arm 22 and the shoulder 44 rests on the arm 24. In this position, that portion of the negative strap 46 which is under the shoulder 42 will be in direct contact with the metal arm 22 and a ground connection is afforded through the arm 22, bar 18 and into the frame 10. It will be observed that the thickness of the shoulder portion 42 containing the strap 46 is slightly reduced to accommodate the strap 46 so that the shoulder 42 rests evenly on the arm 22. The underside of the positive strap 48 rests on the contact bar 30 to form a direct connection to the cable 36 and hence to the vehicle generator (not shown) and the shoulder 44 is reduced in thickness in part to accommodate the strap 48 in the same manner and for the same purpose as described for shoulder 42. The shoulders 42 and 44 are detachably secured to the respective brackets 12 and 14 by the bolt and wing nuts 50 and 52. In this arrangement it will be observed that for the bolt 52 (Fig. 3), a suitable insulation washer 54 is provided so there will be no electrical contact means between this bolt and the contact bar 30 through which the bolt passes. A steel reinforcing member 56 is preferably placed within the battery case 40 that extends across the shoulders, down the side and across the bottom thereof as shown in Fig. 3. This provides added strength especially at the shoulders where the weight of the battery is carried on the brackets.

In using this battery and bracket, the bracket once mounted serves not only as a bracket support but affords direct electrical connection to the vehicle generator and the battery hook-up thereto is completed by merely plac-

electrical system that will receive electric energy from said battery.

8. In combination, a first and second metal bracket in spaced relationship, each of said brackets having a horizontal supporting arm, a strip of electrical insulating material on the supporting arm of said first bracket, a metal contact bar on said insulating material and free of physical contact with said first bracket, a wet cell battery, a protruding shoulder on each of two opposite sides of said battery, said battery mountable on said brackets so that said shoulders rest respectively thereon, means for removably securing said shoulders to said brackets, a metal strap negative terminal connected to said battery, said strap extending over the edge of one shoulder and bent back to engage the underside thereof, a metal strap positive terminal connected to said battery and similarly arranged on the other shoulder, said negative terminal under its respective shoulder automatically engageable with the supporting arm of said second bracket when said battery is arranged on said brackets, said positive terminal under its respective shoulder automatically engageable with said contact bar when said battery is arranged on said brackets the engagement of said respective points provided by the weight of said battery, means on each respective bracket for securing the respective shoulder thereto, said means being insulated on the bracket having said positive electrical contact, and an electrical conduit connected at one end to one end of said contact bar and at its other designed to connect to an electrical system that will receive electric energy from said battery.

References Cited in the file of this patent

UNITED STATES PATENTS

| | | |
|---|---|---|
| 656,882 | Condict | Aug. 28, 1900 |
| 1,320,747 | Elderkin | Nov. 4, 1919 |
| 1,514,056 | Leitzen | Nov. 4, 1924 |
| 1,677,789 | Mabey | July 17, 1928 |
| 1,952,150 | Trimble | Mar. 27, 1934 |
| 2,007,320 | Young | July 9, 1935 |